United States Patent
Marnani et al.

(10) Patent No.: US 10,466,272 B2
(45) Date of Patent: Nov. 5, 2019

(54) THERMAL PROBE

(71) Applicant: Nederlandse Organisatie voor toegepast—natuurwetenschappelijk onderzoek TNO, 's-Gravenhage (NL)

(72) Inventors: Hamed Sadeghian Marnani, s-Gravenhage (NL); Roy Jacobus Franciscus Bijster, s-Gravenhage (NL)

(73) Assignee: NEDERLANDSE ORGANISATIE VOOR TOEGEPAST-NATUURWETENS CHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 15/736,154

(22) PCT Filed: Jun. 14, 2016

(86) PCT No.: PCT/NL2016/050426
§ 371 (c)(1),
(2) Date: Dec. 13, 2017

(87) PCT Pub. No.: WO2016/204611
PCT Pub. Date: Dec. 22, 2016

(65) Prior Publication Data
US 2018/0180644 A1 Jun. 28, 2018

(30) Foreign Application Priority Data

Jun. 15, 2015 (EP) .................................. 15172036

(51) Int. Cl.
*G01Q 60/58* (2010.01)
*G01K 5/62* (2006.01)
*G01K 5/64* (2006.01)

(52) U.S. Cl.
CPC ............... *G01Q 60/58* (2013.01); *G01K 5/62* (2013.01); *G01K 5/64* (2013.01)

(58) Field of Classification Search
CPC ............ G01Q 60/58; G01K 5/64; G01K 5/62
(Continued)

(56) References Cited

U.S. PATENT DOCUMENTS

| | | | | |
|---|---|---|---|---|
| 2009/0056428 A1* | 3/2009 | King | ..................... | B82Y 35/00 73/105 |
| 2012/0260374 A1* | 10/2012 | McConney | ............ | B82Y 35/00 850/1 |
| 2013/0010829 A1* | 1/2013 | Ojima | ..................... | B82Y 35/00 374/208 |

FOREIGN PATENT DOCUMENTS

| | | |
|---|---|---|
| JP | 08105801 | 4/1996 |
| WO | 2011145305 A1 | 11/2011 |

OTHER PUBLICATIONS

Shen et al., "Surface Phonon Polaritons Mediated Energy Transfer Between Nanoscale Gaps", Nano Letters, vol. 9, No. 8, pp. 2909-2913; 2009.
(Continued)

*Primary Examiner* — Michael Maskell
(74) *Attorney, Agent, or Firm* — Hoffmann & Baron, LLP

(57) ABSTRACT

Thermal probe (10) for a scanning thermal microscope (100), use, and process of manufacturing. The thermal probe (10) comprises a single-material (M1) thermal conducting body (12) consisting of a probe frame (14) ending in a probe tip (11). A bi-material (M1,M2) cantilever strip (13) is connected to the probe frame (14) in thermal communication with the probe tip (11). The cantilever strip (13) in unbended state lies in-plane (X,Z) with the probe tip (11). The cantilever strip (13) comprises layers of material (M1,M2) having different coefficients of thermal expansion configured to bend the cantilever strip (13) with respect to the single-
(Continued)

material thermal conducting body (12) as a function of the heat exchange (H) between the probe tip (11) and the microscopic structure (2) for measuring heat exchange (H) with a sample interface (1) by means of measuring the bending of the cantilever strip (13).

14 Claims, 3 Drawing Sheets

(58) Field of Classification Search
USPC .......................................................... 850/50
See application file for complete search history.

(56) References Cited

OTHER PUBLICATIONS

Nakabeppu et al., "Scanning Thermal Imaging Microscopy Using Composite Cantilever Probes", Appl. Phys. Lett., vol. 66, No. 6, pp. 694-696; 1995.

* cited by examiner

US 10,466,272 B2

THERMAL PROBE

This application is the U.S. National Phase of, and Applicants claim priority from, International Patent Application Number PCT/NL2016/050426 filed 14 Jun. 2016, which claims priority from EP 15172036.4 filed 15 Jun. 2015, each of which is incorporated herein by reference.

TECHNICAL FIELD AND BACKGROUND

The present disclosure relates to a thermal probe for a scanning thermal microscope, use of the thermal probe, and a process of manufacturing the thermal probe.

Local temperature and thermal conductivity of a sample interface can be measured e.g. using a scanning thermal microscope (SThM) with a thermal probe comprising a probe tip. Generally, when two bodies at different temperatures are separated by a gap, they can exchange heat via thermal radiation. In the far-field approximation, i.e. when the gap is much larger than the characteristic thermal wavelength, the magnitude of heat transfer may be described by the classic Stefan Boltzmann law. However, when the thermal probe is brought close to the sample interface, i.e. in the "near-field", non-classical phenomena such as wave interference, surface resonances and photon tunnelling can become important, typically causing the radiative heat transfer to increase with decreasing gap size. Also conductive and/or convective heat transfer may become important at close proximity to the surface.

For example, Nakabeppu et al. (Appl. Phys. Lett., Vol. 66, No. 6, 1995) describes scanning thermal imaging microscopy using composite cantilever probes. The technique uses the atomic force microscope (AFM) to scan a composite (bi-material) cantilever probe made of a thin metal film deposited on a regular silicon nitride AFM probe. During tip-surface contact, heat flow through the tip changes the cantilever temperature which bends the cantilever due to differential thermal expansion of the two probe materials. However, micro-scale forces on the probe tip at close proximity, such as van der Waals forces and electrostatic forces, can cause interference with the thermal measurement.

For example, Shen et al. (Nano Lett. 9, 2909-13, 2009) describes surface phonon polaritons mediated energy transfer between nanoscale gaps using a microsphere that is glued to a bi-layer (bi-material) cantilever. When heat is transferred from the probe tip to the sample substrate or vice versa the temperature distribution over the cantilever changes, causing its material layers to expand. Because the materials have different heat expansion coefficients, the cantilever tends to curve in reaction to the heat that is transferred between the probe and the substrate. The curvature can be measured e.g. using a laser beam focused on the tip of the cantilever and reflected onto a position sensitive detector. However, it is difficult to control the close distance between the probe tip and sample interface since this is influenced by the heat exchange and interaction forces with the sample interface.

Accordingly, there is a need for an improved thermal probe for a scanning thermal microscope wherein disadvantages of the prior art are alleviated.

SUMMARY

One aspect of the present disclosure provides a thermal probe, e.g. suitable for a scanning thermal microscope. The thermal probe comprises a thermal conducting body consisting of a probe frame ending in a probe tip. In use, the probe tip is arranged in a probe direction perpendicular to a sample interface for measuring a microscopic structure on the sample interface in vicinity of the probe tip by heat exchange between the probe tip and the microscopic structure. The thermal probe comprises a bi-material cantilever strip connected to the probe frame in thermal communication with the probe tip through its single-material thermal conducting body. The cantilever strip in unbended state lies in-plane with the probe tip. The cantilever strip comprises layers of material having different coefficients of thermal expansion configured to bend the cantilever strip with respect to the single-material thermal conducting body as a function of the heat exchange between the probe tip and the microscopic structure. The heat exchange can be measured by means of measuring the bending of the cantilever strip e.g. by reflection of a laser beam.

Advantageously, a force on the probe tip along the probe direction, causes minimal or no bending of the cantilever strip as configured herein because the cantilever strip in unbended state lies in-plane with the probe tip. Accordingly, a curvature of the cantilever strip is less affected by surface forces. Preferably, the thermal conducting body experiences minimal or no bending under the influence of temperature variation. For example the thermal conducting body consists of a single material or combination of materials having substantially the same or similar heat expansion coefficient. As a result, the bending of the probe frame holding the probe tip can be largely independent of the bending of the cantilever strip because the probe frame does not bend under thermal influence like the cantilever strip. Accordingly, a position of the probe tip is less affected by thermal influence. In view of these and other advantages described below, an improved thermal probe for a scanning thermal microscope is obtained.

By supporting the tip of the thermal probe over the sample interface using one or more support arms consisting of a single material, the tip can be held more stably over the sample interface. For example, the bi-material cantilever strip can be arranged between two support arms of a single material. By configuring the cantilever strip to bend in a direction parallel to the plane of the sample interface, the curvature of the strip can be less dependent on movement of the probe in the direction of the tip, which is perpendicular to the sample interface. Accordingly, measurement accuracy can be further improved. For example, the cantilever strip can be extended sideways from the probe frame, perpendicular to the probe direction.

By providing distance between the probe tip and the cantilever strip with at least part of the single-material probe frame there between, movement of the tip can be further decoupled from movement of the cantilever. Decoupling can be further improved by providing a probe frame with increased rigidity with respect to the cantilever strip. In one embodiment, the layers of the bi-material cantilever strip have a combined thickness that is lower than a thickness of the single-material layer of the probe frame. Alternatively or additionally, a relatively low rigidity of the cantilever strip can be provided by the choice of less rigid materials.

By providing a substantially flat thermal probe, i.e. wherein the probe frame, tip, and cantilever strip (in unbended state) are all substantially extending in a single plane, the probe can be more easily manufactured. For example, a strip of a first material extending from the flat probe frame can be bonded with a second material to easily manufacture the cantilever strip in unbended state. For example, the probe tip can be formed at a flat triangular ending of the probe frame. The probe tip can be made sharper, e.g. using chemical etching or any other technique. Depending on the desired resolution, the probe tip preferably has a point radius of less than a ten micron, less than one micron, less than hundred nanometer, or even smaller, e.g. between one and ten nanometer. For example, the point radius of the probe tip can be defined over a solid angle of more than one steradian.

For example, the thermal probe can be manufactured as follows. A wafer consisting of a first material is provided and a protruding contour of the thermal probe is etched into the wafer. The contour comprises a connected flat shape of the probe frame, the probe tip, and the cantilever strip. The flat shape of the cantilever strip is locally thinned with respect to the rest of the probe frame and a second material is deposited onto the thinned cantilever strip to form the bi-material cantilever strip. The thermal probe thus manufactured can be isolated from the rest of the wafer, e.g. by etching away the wafer or etching away a release layer between the thermal probe and the wafer. Suitable materials include for example silicon for the first material and gold for the second material. Also other material can be used. To improve resolution, the tip of the probe can be further sharpened, before and/or after release from the wafer substrate.

The thermal probe can be used for example as follows. The probe tip of the thermal probe is held or scanned suspended in the vicinity of a microscopic structure on a sample interface. A light beam is directing onto the cantilever strip and deflection of the light beam resulting from temperature induced bending of the cantilever strip is measured. Heat exchange between the microscopic structure and the probe tip is calculated from the measured deflection of the light beam.

The thermal probe can be part of a scanning thermal microscope comprising an actuator stage holding the thermal probe. By attaching the thermal probe to the actuator stage at the probe frame opposite the ending of the probe tip with only the single material there between, the tip will experience less influence from the temperature induced curvature of the bi-material cantilever strip attached to the single-material frame. Accordingly, the actuator stage may be more accurate in determining the position of the probe tip with respect to the sample interface. For example, the actuator stage can be disposed between the fixed world of a microscope support structure and the thermal probe suspended over the sample interface.

By directing a light beam, e.g. laser, onto the cantilever strip and measuring deflection thereof, the heat exchange of the probe tip with a microscopic structure on a sample interface can be measured. Heat exchange between the probe tip and the sample interface can be calculated based on a measured deflection of the light beam caused by bending of the cantilever strip. The position of the probe tip can also be controlled, e.g. with a feedback loop, depending on the measured bending of the cantilever strip. By using a heating plate below the sample interface a desired temperature difference between the sample interface and probe tip can be effected.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
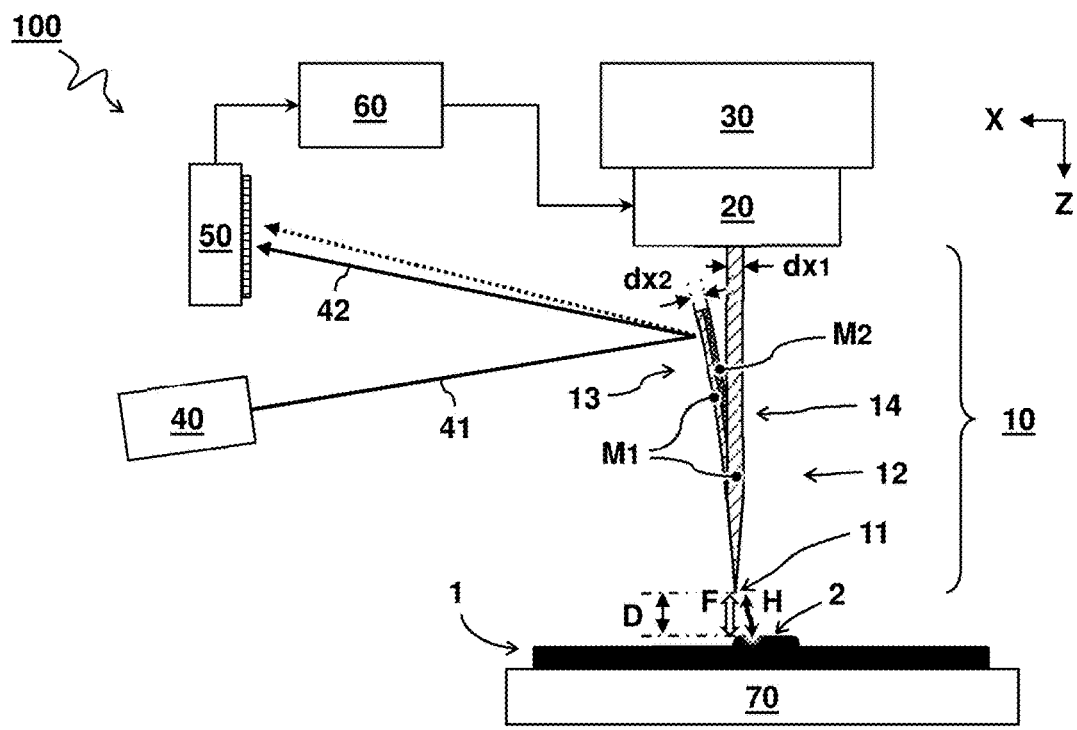
FIGS. 1A and 1B schematically illustrate a side and front view of a thermal microscope comprising a thermal probe according to a first embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. In some instances, detailed descriptions of well-known devices and methods may be omitted so as not to obscure the description of the present systems and methods. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

Figure 1B:
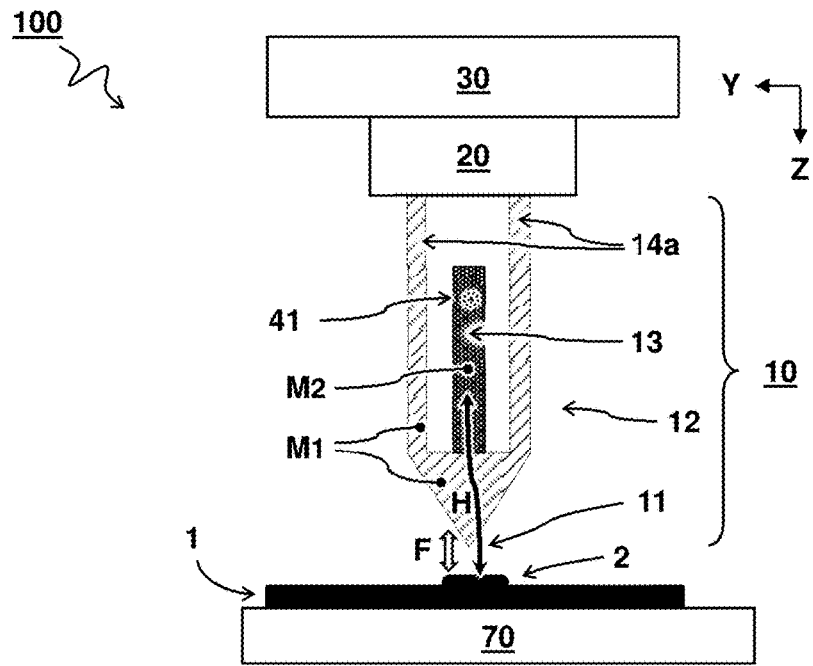

FIGS. 1A and 1B schematically illustrate a side and front view of a thermal microscope 100 comprising a thermal probe 10 according to a first embodiment.

The thermal probe 10 comprises a thermal conducting body 12 consisting of a probe frame 14 ending in a probe tip 11. In one embodiment, the thermal conducting body 12 does not bend under the influence of temperature variation. For example, as shown in the present embodiments, the thermal conducting body 12 consists of a single material M1.

Alternatively, the thermal conducting body 12 may comprise a combination of one or more materials having substantially the same heat expansion coefficient, or any other configuration or combination of materials and layers that prevent bending of the thermal conducting body 12 under the influence of temperature variation.

The probe tip 11 is arranged in a probe direction Z perpendicular to a sample interface 1. The probe tip 11 is configured to measure a microscopic structure 2 on the sample interface 1 in vicinity of the probe tip 11 by heat exchange H between the probe tip 11 and the microscopic structure 2. A bi-material cantilever strip 13 is connected to the probe frame 14 in thermal communication with the probe tip 11 through its single-material thermal conducting body 12. The cantilever strip 13 in unbended state lies in-plane X,Z with the probe tip 11. The cantilever strip 13 comprises layers of material M1,M2 having different coefficients of thermal expansion. The layers are configured to bend the cantilever strip 13 with respect to the single-material thermal conducting body 12 as a function of the heat exchange H between the probe tip 11 and the microscopic structure 2. The heat exchange H can thus be measured by means of measuring the bending of the cantilever strip 13.

The term "single-material" is used herein to indicate that the probe frame and tip comprise only one material or layer as opposed to the "bi-material" layers of the cantilever strip. The single-material frame has the property that it has a single heat expansion coefficient as opposed to the two expansion coefficients of the bi-material cantilever strip that cause temperature dependent bending. Accordingly, the single-material probe frame does not bend as a function of temperature like the bi-material cantilever strip. By the present configuration, a bending of the cantilever strip 13 is independent of a bending of the probe frame 14 and/or probe tip 11 which are less affected by the heat exchange.

The term "unbended state" indicates the state of the cantilever strip wherein the strip forms a straight plate. This is typically at the temperature at which the layers of different materials M1,M2 were bonded and wherein there is no bending force is present between the materials of the strip. The term "in-plane" indicates that the main surface of the strip (in unbended state) lies in the same or parallel plane as a plane encompassing the direction of the probe tip ("probe direction Z"). By the present configuration, a surface force "F" on the probe tip 11 along the probe direction Z does not directly cause substantial bending of the cantilever strip 13 which lies in the plane parallel to the tip.

In one embodiment, as shown, the probe frame 14 comprises two support arms 14a for supporting an end of the thermal probe 10 comprising the probe tip 11 over the sample interface 1. In the embodiment, the bi-material cantilever strip 13 is configured to bend independently of the one or more support arms 14 which are made of a single-material layer M1. In the shown embodiment the cantilever strip 13 is arranged between the support arms 14a. Also other configurations are possible, e.g. with one or more support arms and/or wherein the cantilever strip is at a different position.

Preferably, the probe frame 14 is more rigid than the cantilever strip 13. Accordingly, surface forces F may have less influence on bending of the probe frame 14 or cantilever strip 13. For example, in one embodiment, the layers of material M1,M2 forming the bi-material cantilever strip 13 have a combined thickness "dx2" that is lower than a thickness "dx1" of the single-material layer of the probe frame 14. The combined layers can also be thicker, but at lower rigidity. In the present embodiment, the same material M1 is used to form the probe frame 14 and as one of the two material M1, M2 to form the cantilever strip 13. Alternatively, or in addition, the materials forming the cantilever strip 13 can be different than that of the probe frame 14. For example, the materials forming the cantilever strip 13 can be more flexible than that forming the probe frame 14.

In one embodiment, the probe tip 11, probe frame 14, and cantilever strip 13 in unbended state are substantially flat extending in a single plane Y, Z. In a further embodiment, the probe tip 11 is formed at a flat triangular ending of the probe frame 14. In case of a sharp probe tip, preferably, the probe tip 11 has a point radius of less than a hundred micron, e.g. between one and hundred nanometer. Also other geometries are possible.

In one embodiment, the scanning thermal microscope 100 comprises an actuator stage 20 holding the thermal probe 10 by attachment to the probe frame 14 opposite the ending of the probe tip 11. In one embodiment, the probe frame 14 does not bend under the influence of temperature variation at least between the ending of the probe tip 11 and the attachment to the actuator stage 20. For example, the thermal probe 10 is formed of a single material layer M1, or combination of materials configured to have substantially the same heat expansion coefficient, at least between the ending of the probe tip 11 and the attachment to the actuator stage 20.

In one embodiment, the actuator stage 20 is configured to actuate a position X,Y,Z of the probe tip 11 of the thermal probe 10 with respect to a sample interface 1. In a further embodiment, the actuator stage 20 comprises a piezoelectric actuator. In one embodiment, the actuator stage 20 is disposed between a microscope support structure 30 and the thermal probe 10 and configured to control the distance D between the probe tip 11 and a sample interface 1.

While the present disclosure can in principle be applied to any type of thermal microscope, it can provide particular advantage in microscope wherein a distance of the probe tip to the sample interface is relatively low and interaction forces with the surface are relatively strong. For example, in a near-field heat exchange microscope, the distance D is comparable or less than the characteristic (thermal) wavelength $\lambda_c$ e.g. given by Wien's displacement law as $$\lambda_c \cong \frac{2900 \ \mu m \cdot K}{TK}$$

wherein "T" is the absolute temperature of the sample interface and/or probe tip expressed in Kelvin (K). For the present application, a thermal microscope with a probe tip designed to be positioned at or below 10 μm from the sample interface can be considered a "near-field" thermal microscope. For example, at a temperature of 300 K, separations below 10 μm will result in a steeply increasing heat flux with decreasing separation as described by Ottens et al. in Phys. Rev. Lett. 107, 014301 (2011).

Also non-radiative heat transfer may be important at close proximity, e.g. at a distance "D" between the probe tip and sample interface below 100 μm, below 10 μm, below 1 μm, or even closer, e.g. between 0.1 and 100 nm. The surface interaction forces are typically stronger, the closer the probe tip comes to the sample interface. For example, heat can be transferred through gas conduction at extreme proximity to the surface where Van der Waals forces can be strong. Also heat transfer by convection can play an important role. It will be appreciated that the present disclosure can provide the advantages of decoupling the effects of surface forces on the temperature measurement, irrespective of the mode of heat transfer In one embodiment, the thermal microscope 100 comprises or couples to a light source 40 configured to direct a light beam 41 onto the cantilever strip 13. A detector 50 can be configured to measure an amount of (angular) deflection of the light beam 42 which is a function of the bending of the cantilever strip 13 for measuring the heat exchange H of the probe tip 11 with the microscopic structure 2 on the sample interface 1. For example, the detector comprises a position sensitive detector (PSD). For example, the light source 40 comprises a laser.

In one embodiment, the thermal microscope 100 comprises a controller 60 configured to control the actuator stage 20 based on a measured deflection of the light beam 42 caused by the heat induced bending of the cantilever strip 13. For example, the actuator stage 20 can be controlled based on a feedback loop to keep a certain distance D. Also other control of the actuator stage 20 can be used.

In one embodiment, the thermal microscope 100 comprises a data processor (not shown) configured to calculate a heat exchange H between the probe tip 11 and the sample interface 1 based on a measured deflection of the light beam 42 caused by bending of the cantilever strip 13.

In one embodiment, the thermal microscope 100 comprises a heating plate 70 below the sample interface 1 to be measured. For example, the heating plate 70 may cause heating of the sample interface above a temperature of the thermal probe 10 for increasing heat exchange. Alternatively, or in addition, also the thermal probe 10 may be heated. Alternatively, or in addition either one or both of the sample interface 1 and thermal probe 10 may be actively or passively cooled to increase a temperature difference there between.

In one application, use of the thermal probe 10 comprises suspending the probe tip 11 of the thermal probe 10 in the vicinity of a microscopic structure 2 of a sample interface 1, directing a light beam 41 onto the cantilever strip 13, measuring deflection of the light beam 42 resulting from temperature induced bending of the cantilever strip 13, and calculating heat exchange H between the microscopic structure 2 and the probe tip 11 from the measured deflection of the light beam 42.

Figure 2A:
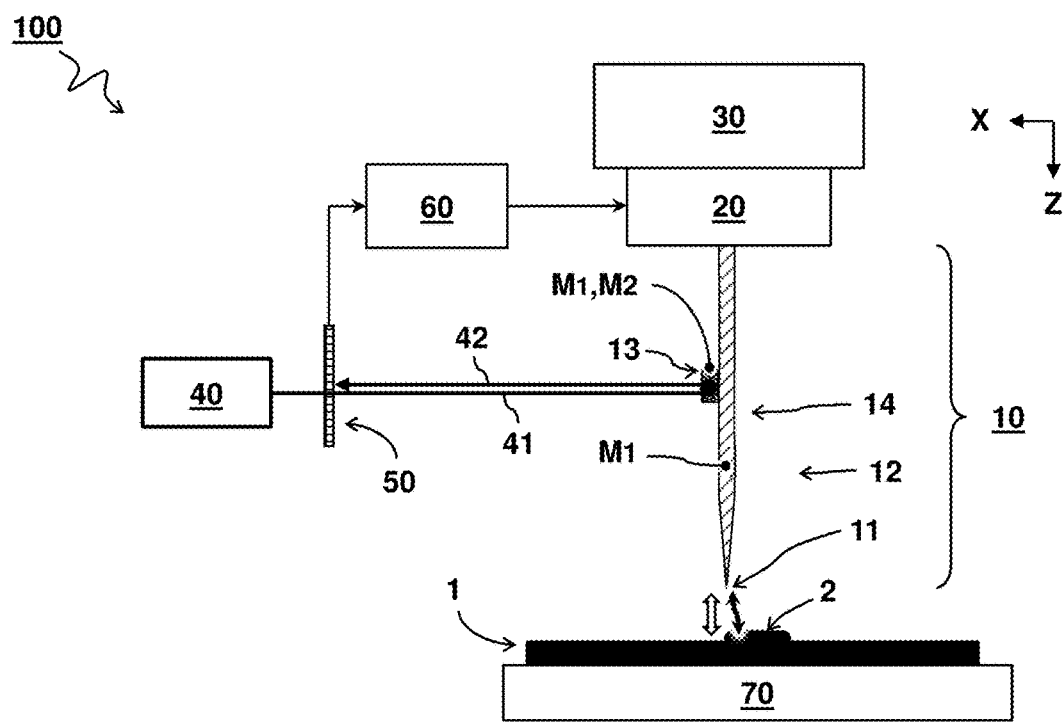
FIGS. 2A and 2B schematically illustrate a side and front view of a thermal microscope comprising a thermal probe according to a second embodiment.
Figure 2B:
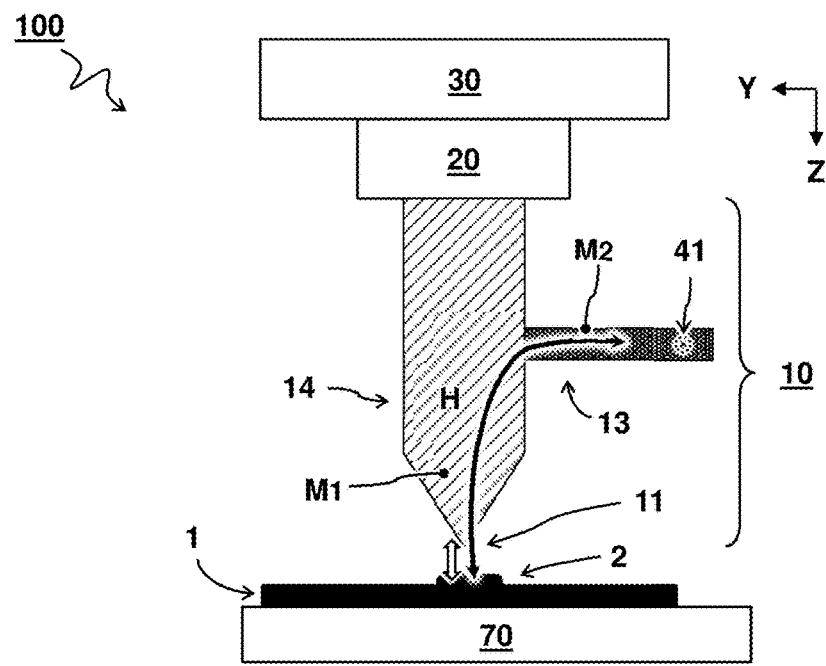

FIGS. 2A and 2B schematically illustrate a side and front view of a thermal microscope 100 comprising a thermal probe 10 according to a second embodiment. The second embodiment has similar features and advantages as the first embodiment described with reference to FIG. 1.

As a point of difference, in the second embodiment, the cantilever strip 13 in unbended state extends sideways from the probe frame 14 perpendicular to the probe direction Z. The cantilever strip 13 is thus configured to bend in-plane (X,Y) parallel with the sample interface 1 which is perpendicular to the probe direction Z. This has the advantage with respect to the first embodiment that the curvature of the cantilever strip 13 is even less dependent on its lateral positioning along the probe direction Z due to the translation symmetry of the strip surface along the Z axis.

In one embodiment, the cantilever strip 13 is distanced from the probe tip 11 with at least part of the single-material probe frame 14 there between. This has the advantage further decoupling the cantilever strip 13 from the forces F acting on the thermal probe 10 from the sample interface 1.

Figure 3A:
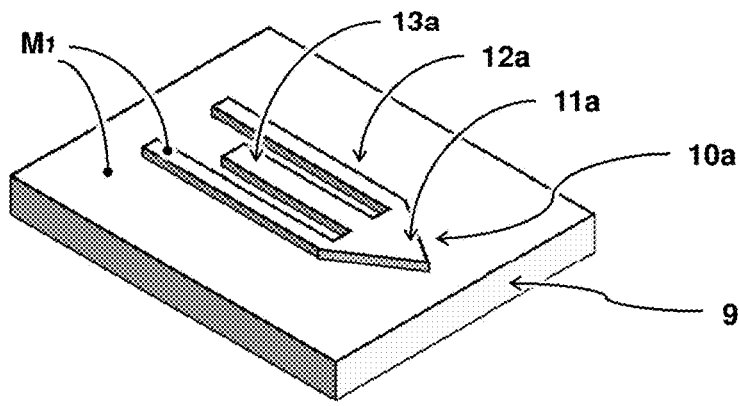
FIGS. 3A-3C schematically illustrate a perspective view of different steps of manufacturing a thermal probe according to the first embodiment.
Figure 3B:
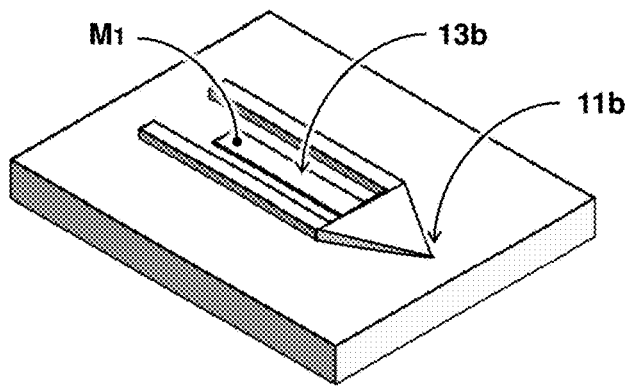
Figure 3C:
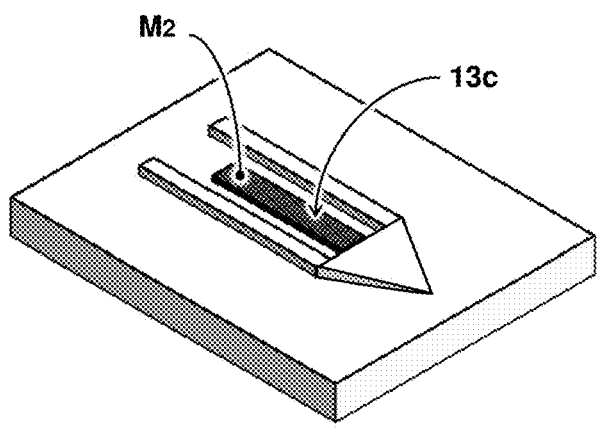

FIGS. 3A-3C schematically illustrate a perspective view of different steps of manufacturing a thermal probe according to the first embodiment.

In one embodiment, as shown in FIG. 3A, the process of manufacturing the thermal probe comprises providing a wafer 9 consisting of a first material M1 and etching a protruding contour of the thermal probe 10a into the wafer 9. For example, the wafer has a thickness of one millimeter and the height of the etched contour (thickness of the thermal probe) is on the order of one micrometer, e.g. between 0.1 and 10 μm. For example, the contour comprises a connected flat shape of the probe frame 12a, the probe tip 11a, and the cantilever strip 13a. In a further embodiment, as shown in FIG. 3B, the process of manufacturing comprises locally thinning the flat shape of the cantilever strip 13b and/or probe tip 11b. In a further embodiment, as shown in FIG. 3C, the process of manufacturing comprises depositing a second material M2 onto the thinned cantilever strip 13c to form the bi-material cantilever strip.

In one embodiment (not shown), the process of manufacturing comprises isolating the thermal probe from the wafer, e.g. by etching away the wafer 9 or etching away a release layer (not shown) between the thermal probe and the wafer. In one embodiment, the process of manufacturing comprises etching the probe tip 11 to obtain a point radius below hundred microns or less.

In one embodiment the probe frame comprises a single layer of a first material M1, wherein the cantilever strip extends from the probe frame as a strip of the first material M1 having reduced thickness compared to that of the probe frame. A layer of a second material M2 is bonded to the extended strip of the first material M1 together forming the bi-material cantilever strip. For example, the first material M1 is silicon and the second material M2 is gold. Also other materials are possible. Although this may be more difficult to manufacture, the materials used for the cantilever strip may also both be different materials than that of the probe frame, e.g. by depositing two layers of different material (not shown).

For the purpose of clarity and a concise description, features are described herein as part of the same or separate embodiments, however, it will be appreciated that the scope of the invention may include embodiments having combinations of all or some of the features described. For example, while embodiments were shown for cantilever strips comprising different material layers, also alternative ways may be envisaged by those skilled in the art having the benefit of the present disclosure for achieving a similar function and result. E.g. other types of thermo-mechanical transducers may be used for similar effect. Components may optionally be combined or split up into one or more alternative components. The various elements of the embodiments as discussed and shown offer certain advantages, such as improving measurement accuracy of a thermal microscope by decoupling the effects of interaction forces and heat transfer. Of course, it is to be appreciated that any one of the above embodiments or processes may be combined with one or more other embodiments or processes to provide even further improvements in finding and matching designs and advantages. It is appreciated that this disclosure offers particular advantages to thermal microscopy, and in general can be applied for any application wherein temperature is measured using a combination of a thermo-mechanical transducer connected to probe tip. For example, the thermal probe as described herein may also find application in lithography, e.g. as part of a lithographic apparatus to detect and measure structures such as markers or conductive tracks on a wafer.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A thermal probe for a scanning thermal microscope, the thermal probe comprising:
   a thermal conducting body consisting of a probe frame ending in a probe tip in use arranged along a probe direction perpendicular to a sample interface for measuring a microscopic structure on the sample interface in vicinity of the probe tip by heat exchange between the probe tip and the microscopic structure; and
   a bi-material cantilever strip connected to the probe frame in thermal communication with the probe tip through the thermal conducting body, wherein the probe direction of the probe tip lies in-plane with the cantilever strip in unbended state and the probe frame, wherein the cantilever strip comprises layers of material having different coefficients of thermal expansion configured to bend the cantilever strip with respect to the thermal conducting body as a function of the heat exchange between the probe tip and the microscopic structure for measuring the heat exchange by means of measuring the bending of the cantilever strip.

2. The thermal probe according to claim 1, wherein the probe frame comprises one or more single-material support arms for supporting an end of the thermal probe comprising the probe tip over the sample interface, wherein the cantilever strip is configured to bend independently of the one or more support arms.

3. The thermal probe according to claim 1, wherein the cantilever strip in unbended state extends sideways from the probe frame perpendicular to the probe direction, wherein the cantilever strip is configured to bend in-plane with the sample interface perpendicular to the probe direction independently of the single-material probe frame, wherein the cantilever strip is distanced from the probe tip with the probe frame there between.

4. The thermal probe according to claim 1, wherein the cantilever strip is distanced from the probe tip with at least part of the single-material probe frame there between.

5. The thermal probe according to claim 1, wherein the probe frame is more rigid than the cantilever strip.

6. The thermal probe according to claim 1, wherein the probe tip, probe frame, and cantilever strip in unbended state are substantially flat extending in a single plane.

7. The thermal probe according to claim 1, wherein the probe frame comprises a single layer of a first material; wherein the cantilever strip extends from the probe frame as a strip of the first material having reduced thickness compared to that of the probe frame, wherein a layer of a second material is bonded to the extended strip of the first material together forming the bi-material cantilever strip.

8. The thermal probe according to claim 1, wherein the probe tip is formed at a flat triangular ending of the probe frame.

9. The thermal probe according to, wherein the probe tip has a point radius of less than a hundred micron.

10. A scanning thermal microscope comprising:
    a thermal probe for a scanning thermal microscope, the thermal probe comprising:
    a thermal conducting body consisting of a probe frame ending in a probe tip in use arranged along a probe direction perpendicular to a sample interface for measuring a microscopic structure on the sample interface in vicinity of the probe tip by heat exchange between the probe tip and the microscopic structure; and
    a bi-material cantilever strip connected to the probe frame in thermal communication with the probe tip through the thermal conducting body, wherein the probe direction of the probe tip lies in-plane with the cantilever strip in unbended state and the probe frame, wherein the cantilever strip comprises layers of material having different coefficients of thermal expansion configured to bend the cantilever strip with respect to the thermal conducting body as a function of the heat exchange between the probe tip and the microscopic structure for measuring the heat exchange by means of measuring the bending of the cantilever strip; and
    an actuator stage holding the thermal probe by attachment to the probe frame opposite the ending of the probe tip;
    wherein the probe frame does not bend under the influence of temperature variation at least between the ending of the probe tip and the attachment to the actuator stage.

11. The scanning thermal microscope according to claim 10, comprising:
    a light source configured to direct a light beam onto the cantilever strip; and
    a position sensitive detector configured to measure an amount of deflection of the light beam resulting from a bending of the cantilever strip for measuring the heat exchange of the probe tip with a microscopic structure on a sample interface.

12. The scanning thermal microscope according to claim 10, comprising a controller configure to control the actuator stage based on a measured deflection of the light beam caused by the heat induced bending of the cantilever strip.

13. The scanning thermal microscope according to claim 10, comprising a heating plate below the sample interface to be measured.

14. A method of manufacturing a thermal probe comprising: a thermal conducting body consisting of a probe frame ending along a probe tip arranged in a probe direction perpendicular to a sample interface, and a bi-material cantilever strip connected to the probe frame in thermal communication with the probe tip through its thermal conducting body, wherein the cantilever strip in unbended state lies in-plane with the probe tip, wherein the cantilever strip comprises layers of material having different coefficients of thermal expansion configured to bend the cantilever strip with respect to the thermal conducting body as a function of temperature, the method comprising:
    providing a wafer consisting of a first material;
    etching a protruding contour of the thermal probe into the wafer, wherein the protruding contour comprises a connected flat shape of the probe frame, the probe tip, and the cantilever strip;
    locally thinning the flat shape of the cantilever strip; and
    depositing a second material onto the thinned cantilever strip to form the bi-material cantilever strip.

* * * * *